Aug. 2, 1949.　　　　G. H. COLEMAN　　　2,477,578
TIMING DEVICE FOR CAMERA SHUTTERS

Filed July 25, 1946　　　　　　　　　2 Sheets-Sheet 1

INVENTOR.
GEORGE H. COLEMAN
BY
William D. Hall
Attorney

Aug. 2, 1949.    G. H. COLEMAN    2,477,578
TIMING DEVICE FOR CAMERA SHUTTERS
Filed July 25, 1946    2 Sheets-Sheet 2

INVENTOR.
GEORGE H. COLEMAN
BY
William D. Hall.
Attorney

Patented Aug. 2, 1949

2,477,578

UNITED STATES PATENT OFFICE 2,477,578

TIMING DEVICE FOR CAMERA SHUTTERS

George H. Coleman, Lawrence, Mass.

Application July 25, 1946, Serial No. 686,092

1 Claim. (Cl. 73—5)

(Granted under the act of March 3, 1883, as amended April 30, 1928; 370 O. G. 757)

The invention described herein may be manufactured and used by or for the Government for governmental purposes, without the payment to me of any royalty thereon.

This invention pertains to photographic equipment and more particularly to a device for determining and evaluating the shutter characteristics of a camera, and the general efficiency of the latter.

It is of considerable importance, in the field of photography, that the proper quantity of light be applied to the light chemically-sensitive film used for taking a photograph in a camera. The more accurate the exposure in time and adequacy is to the requirements, the more perfect is the resultant pictorial effect on the film. In order to determine the correct exposure for a camera or other similar photographic equipment, it is necessary that the speed of the shutter be known accurately. All shutters include various mechanisms, such as gears, levers, springs and cams, and are subject to mechanical trouble and wear, usually incident in such assemblies. Repairs and adjustments are required and made from time to time, and in the process such repairs disturb the original accuracy of the settings. Even the original settings may become misaligned before and during use, due to temperature, atmospheric variations or perhaps effects of transportation. To identify and check the variation accurately and make adjustments to correct same, requires considerable skill, time, and use of special equipment. It is possible to accomplish this only in the laboratories of factories, or those scientific institutions particularly adapted with special facilities to do so. In the above cases, the degree of accuracy is more or less dependent on the judgment and skill of the operator, and is usually of indefinite and uncontrolled latitude. The setting value after repairs and adjustments, made under ordinary commercial circumstances, is so doubtful or uncertain that it frequently results in the spoilage of many films or plates when the camera concerned is employed, that could be avoided. Some repairmen start in by first making a rough test. This is done by taking an actual picture with the camera. This commonly requires the development of several negatives, and positives, if the first one is not satisfactory; takes up considerable time and is relatively expensive. In other particular and more elaborate tests, a photo-cell connected with a suitable network is employed, instead of a film, and its output circuit amplified and electronically transmitted to the screen of an oscilloscope. The display is in turn photographed. In this instance, also, the results, whether satisfactory or not, are not immediately obtainable.

There is another modified arrangement, that has been principally used to eliminate the trial photographing. It consists in the employment of an oscilloscope having a high persistence screen. For general test purposes in this case, the screen need not be photographed but requires an alert operator to make use of it. The above particular arrangements may be used for the conventional interlens or leaf shutters, but generally are not suitable for focal plane shutters. Another method for determining exposure is that used in photographing consecutively with a projection print scale, as it is termed, and deriving from that, the values for about ten exposures on the same single print. It is obvious that the above mentioned testing arrangements do not conveniently lend themselves to shop testing or production testing of all shutter types.

It is an object of this invention to provide a new and improved photometrical evaluator that will avoid one or more of the disadvantages and limitations of the prior art.

It is a further object of the present invention to provide a new and improved photometrical evaluator that will be suitable for accurately and expeditiously measuring the speed of shutters for camera equipment.

A still further object of this invention is to provide a new and improved photometrical evaluator that will be capable of measuring the speed of interlens and focal plane shutters; that can also be used for measuring the degree of synchronization of shutters with flash-gun equipment; and which may be readily constructed in form, size and capacity, suitable for shop and general use.

An additional object of the invention is to provide a new and improved photometrical evaluator that will facilitate the adjustment of shutters and synchronizing equipment used in the camera, and enable timing and light intensity errors to be corrected readily and quickly without entailing more than general routine labor and attention, and having capacity for covering a very comprehensive field of evaluations.

It is another object of the present invention to provide a new and improved photometrical evaluator that will be direct reading, easy to assemble for operation, accurate and relatively portable.

For a better understanding of the invention and for other objects thereof, reference is had to the appended drawings and following description, of an example of the invention used to illustrate its general principles, while the scope of the invention is particularly pointed out in the claims.

Before proceeding to a description of the structure of the photometric evaluator, a brief discussion of the details involved is given to clarify the requirements arising and the features that have to be provided for.

Shutters and shutter testing

Basically, a camera shutter is used during its opening and closing to control the duration of time that light is allowed to fall on the photographic film. Since any given film requires a definite overall quantity of light for proper exposure, then correct exposure, will be a function of time and light intensity.

In the case of an interlens or leaf shutter, the entire film in the frame is exposed to the light and picture being taken, for a definite time. A focal plane shutter, on the other hand, exposes or scans but small portions of the film at a time. It is, in effect, a moving curtain across the film plane. Since all parts of the film should be equally exposed, it is assumed that the product of time T and light intensity B, which will give a product Q for quantity, is the same for all minute film areas, regardless of which type of shutter is used. If the entire film plane, or a given portion of it, has a photo-sensitive surface, the integrated current output would be the same for equal exposure times regardless of whether the photo-sensitive surface was scanned, or exposed all at once.

An evaluation which uses the duration of time that the exposure light falls on the film plane, is known as an interval test. An evaluation which measures the overall quantity of exposure light, is known as a quantitative test. It would appear superficially, that either an evaluation employing interval timing or one using a quantitative testing could be used for testing shutters, however, in practice that is not the fact. An interval timer can be used for interlens or leaf shutters, since exposure time and shutter speed are nearly synonymous. However, when applied to focal plane shutters, it is useless, because the relationship of speed of curtain travel and exposure time varies with shutters of different manufacture and, furthermore, curtain speed is changed little when changing exposure time, the major change being made in curtain slit width.

A quantitative evaluation may be used for evaluating the true exposure speed of both types of shutters. Both the interval time and quantitative evaluations have individual advantages and limitations.

Relative merits of quantitative and interval testing

*Quantitative testing.*—This method gives a true measure of the overall exposure light falling on the film plane and hence is a good indication of actual exposure. Such a test can be used for interlens shutters but must be used for focal plane shutters.

Fundamentally, it makes no practical difference within certain limits, from the exposure standpoint, as far as overall quantity of light is concerned, whether we get a lot of exposure light for a short period of time or a little exposure light for a long period, if the resulting product of both is the same in each case. On this assumption, a photo-cell may be used, instead of photographic film. If its electrode is flooded with an even illumination and the output of the photo-cell adjusted to a given value of current, then the charge on the selected condenser will be equal to the product of T. I. (time×current). This is true if this current is used to charge the condenser and the charging voltage E is large compared with the largest charge we intend to measure.

Any reduction in the illuminated area will reduce I, but if T is increased, then the condenser charge will still be the same. Hence it appears that if a photo-cell is flooded with light and adjusted for a known current I, output, and then scanned, the integrated current from the scanned area will give T; which with I known, is the remaining "unknown" quantity determining exposure.

This type of test has definite limitations, however. Since light quantity or Q is a function of time T, and intensity B, then if B for any reason changes, Q will be in error. This means then that:

(1) The light source must be steady and without dark spots.

(2) The illumination on the film plane must be even, and affected only by normal shutter operation.

The first requirement can be taken care of in the design of the light source.

For focal plane tests, where the front of the camera can be mechanically removed, no trouble is experienced with paragraph 2 above, so long as the exposure light on the film plane covers an area sufficient to minimize normal unavoidable movements of the camera about the photo-cell position.

The point in paragraph 2 above, does become a factor whenever it is not possible to remove or open up the front of the camera, or when the quantitative test is used for checking interlens or leaf shutters. A better appreciation of this can be had by remembering that in making a quantitative evaluation, the shutter is opened full and the light intensity adjusted, so that a given photo-cell output is obtained. The tests are made and the indications taken or read, are based on the assumption that the film plane or photo-cell illumination (which is substituted for the film during evaluation) remains constant.

However, any physical movement or vibration in the camera, shutter or iris, will effect film plane illumination and therefore tends to affect the test or accuracy of successive tests. This emphasizes the fact that the test cannot be easily applied to production testing, since the light intensity setting must be readjusted for each new unit tested, which is tedious work.

A test of this nature is not suitable for checking shutter and flash synchronization. In fact, no assurance of close accuracy is given in any phase of its use, unless a constant check is kept on value of I, which is usually not feasible.

Interval timing

The interval test, as its name implies and as appreciated in this invention, measures the interval of time that a camera shutter is open. It can also be made to measure the time difference existing between two pulses, as in the case of the pulse from a flash-gun circuit and the pulse from the light passing through the shutter as it opens. Such a test would give the degree of synchronization of flash and shutter.

An interval tester can also be used for testing shutter efficiency, especially if the indicating device is an oscilloscope. If it is a meter, efficiency can be computed by noting the difference in times of the bottom and top of the shutter output curves. These points can be measured by controlling the light-intensity level at which the circuit begins to measure.

A simple shutter interval evaluator sometimes employed is one in which the photo-cell output controls a constant-current tube, which is used to charge a condenser, the same, or the charge thereon, hereinafter being referred to as "C." If I and C are known, then the charge on C will be a function of the time that the constant-current tube conducts, or a direct function of shutter speed. The voltage E is then measured with a vacuum-tube voltmeter.

The value of the interval test by this invention can be appreciated when it is realized that once the network is set up for a given type of shutter, the accuracy of the test is not affected by small changes in light-exposure intensity on the film plane. With such a network it is also possible to keep a constant check on the charging current.

In summing up, a quantitative tester is a positive requirement for checking focal plane shutters and that, when such a test is used, the camera and/or shutter must be rigidly held between the light source and photo-cell. It is also practically essential that the light source must be of constant value and rigidly mounted, as also should be the photo-cell, which is also provided for in this invention.

For testing shutter synchronization with a flash gun, an interval test unit is an ideal device as well as being very applicable to the checking of interlens or leaf shutter exposures. In this invention a shutter tester has incorporated all of the desirable features for such tests.

In the drawings.

Similar reference characters refer to similar parts throughout the drawings.

Figures 1, 2:
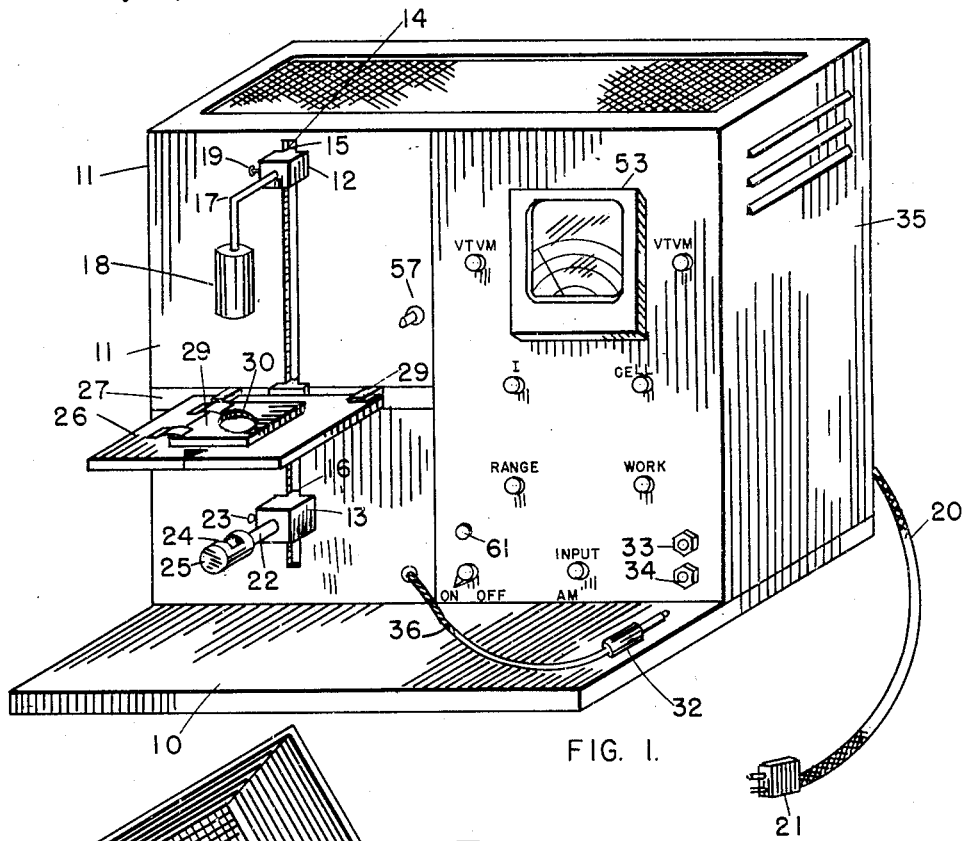
Figure 1 is a perspective view of a camera shutter unit or lens board tester embodying this invention.
Figure 2 is a modified form of the unit used with a camera having a focal-plane shutter, without disassembling the shutter mechanism from the camera.

In the particular construction shown in Figure 1, a base 10 of flat platelike form supports a vertical panel 11 on its upper horizontal surface. The panel is secured in place by an angle or other suitable member attached to the cabinet 35 and the upper surface of the base 10. The panel has a vertical open T-slot 14 situated near its middle and serving as a guide for a suspension block 12, having an adjustable lamp and socket 18. It also supports and guides a photo-cell holder 13. The suspension lock 12 and holder 13 have split T-like lugs, 15 and 16 respectively, that spread resiliently. The resilient spread is sufficient to enable each to stay rigidly in any position they are individually moved into in the slot 14.

A bent tubular arm 17 extends from the suspension block 12 and supports the electric socket and lamp 18, preferably having its light focussed to produce parallel rays. The arm is adjustable rotatably and held in the position selected by a thumb-screw 19 disposed in the suspension block 12. The socket 18 is fed from the back by a conductor cable 20 coupled to a conventional attachment plug 21. Likewise a straight tubular arm 22 extends horizontally out from the holder 13 and is rotatable therein, being locked in a selected position by the set screw 23. The arm 22 supports the photo-cell unit or photo-electric means 24 held within its socket and shade 25.

A laterally and longitudinally adjustable table 26 is slidably held in a horizontal slot 27 running transversely across the panel 11. The panel is held by tripod clamps 29 holding it above and underneath to allow the movement designated. The central portion of the table 26 is drilled to provide an aperture through which light from the lamp 18 can pass to the photo-cell 24, and between which the optical system or unit to be tested, is placed.

The lens board shutter unit 30 is of an ordinary press-type camera, and is placed on the upper surface of the table 26, which is arranged to act as a carrier for, and to hold in place, this unit to be tested. The table enables the unit to be held to it during the test. It affords a firm base for the shutter unit, at the same time permits the latter to be removed readily. Register marks may be engraved to permit alignment to be made and visually checked. Another conductor cable 36 is connected to photocell unit 24 through the tubular arm 22. This cable 36 has a plug 32 coupled to its end for selective insertion in the jacks 33 and 34 for the photocell and synchronizing tests respectively, in a network cabinet 35. The cabinet has various buttons on its face which are lettered to suit their general functions in accordance with conventional practice, and in conjunction with the network indicated in the diagram.

Figure 3:
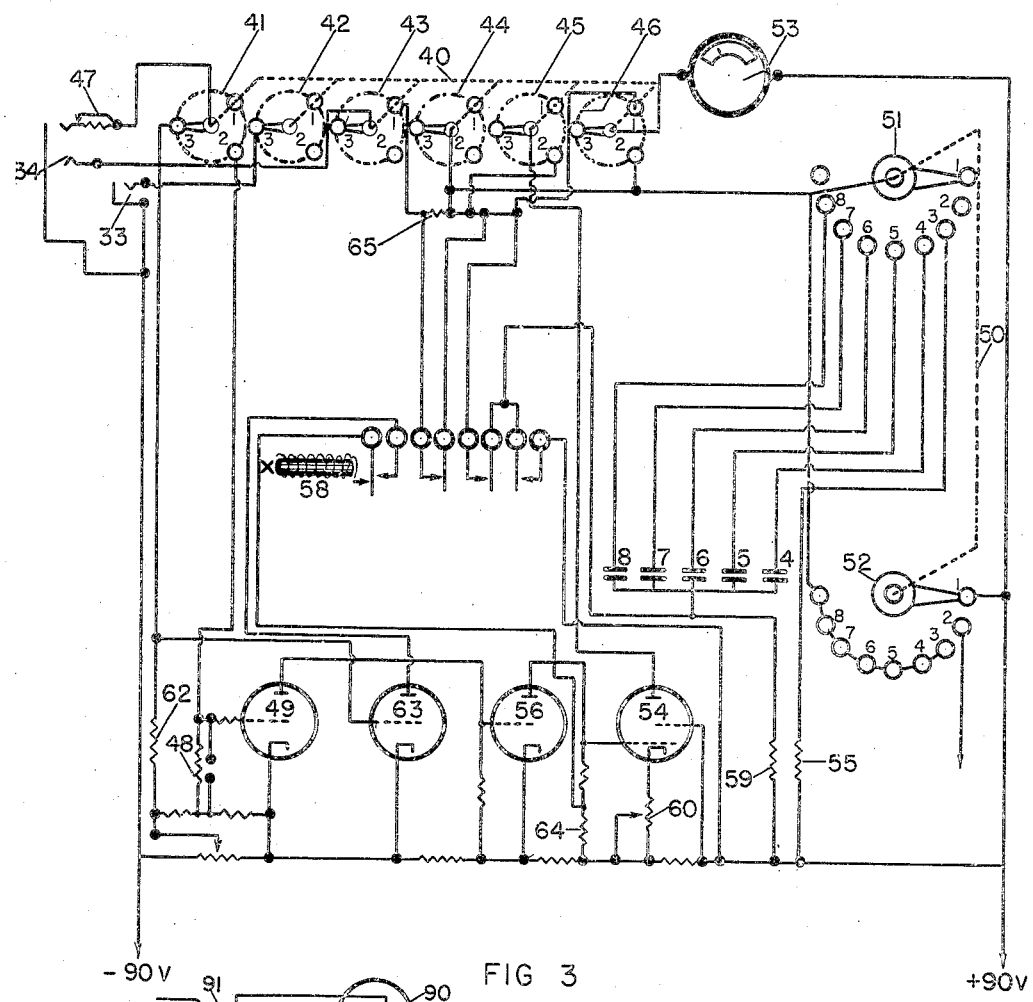
Figure 3 is a diagram of the network of the tester unit indicated in Figure 1.

Referring to the diagrammatic outline of the network shown in Figure 3, there are three tests most desirably made by the apparatus indicated in this embodiment. These are termed for convenience:

(1) Quantitative light test.
(2) Opening interval test.
(3) Synchronism test.

An explanation of each test may be derived from a description of its operation. First, the equipment is set up as indicated in Figure 1 or Figure 2 for the tests of the shutter unit. Then the cables are plugged in to provide current through the network, to warm it up. The warm-up period is about ten (10) minutes.

Secondly, the calibration of the voltmeter 53 is checked. This is accomplished by turning the main gang switch 40. This switch consists of six decks, 41, 42, 43, 44, 45 and 46. This switch is revolved until its arms are registered on its deck segments 2 or to the position #2 thereof. This places it in the position for calibrating, and also for the interval test.

Then the range switch 50, having two decks 51 and 52, has its contact arms placed on its segments 1 or in position #1, and a check made to see that the vacuum tube voltmeter 53 reads, on "zero." If it does not read "zero," a conventional front panel potentiometer control is adjusted until it does. This adjustment is a conventional way of balancing the vacuum-tube voltmeter circuit. After this is done, the range switch 50 is operated until its arms are registered in position #2. If the voltmeter 53 is properly set, its needle will indicate a reading about across two-thirds of the scale. If not, a conventional calibration control provided in the voltmeter is adjusted to obtain this reading. This control is usually a variable shunt across the meter. This changes the sensitivity of the vacuum-tube voltmeter circuit in a usual manner, to suit the requirements involved.

*Interval testing*

The apparatus is adapted for a time interval test of the shutter opening as follows:

(1) The gang switch 40 is moved to position #2.

(2) The plug 32 is plugged into photo-cell jack 34.

(3) Then the range switch 50 is revolved until its arms are registered in position #3.

(4) The shutter unit 30 is then opened and the lamp 18 turned on, so its light will pass through the open shutter unit aperture in the table 26 and shine on the photo-cell 24. The voltmeter reading is watched, and the potentiometer 47 is adjusted to suit. The voltmeter 53 gives its maximum deflection for the light effect on the photocell. The voltage across resistor 48 varies and unbiases the first tube 49. When this is sufficient to produce a conduction of current through tube 49, it cuts out the tube 56, and allows the tube 54 to function in a normal manner. The tube 54 draws current through resistance 55 and produces a voltage drop, that may be read on voltmeter 53. This arrangement provides a static means of determining the light value that will trigger the interval circuit. It can be recognized that with different shutters of different sizes the light intensity falling on the photo-cell will change. With the above arrangement, it is possible to set the circuit to trigger over a wide range. By this same set-up it is possible to measure the interval from the instant the shutter blades open, to the time they are completely closed, or one can measure the interval from, when they are completely open, to when they just begin to close. This is important at high shutter speed since the two intervals are appreciably different. For the average interval test, the circuit is set to trigger when the shutter is 3/4 open, and is set to stop measuring when the blades are 1/4 closed. This setting is accomplished by actuating the diaphragm of the shutter, so that the opening is at 3/4 of full aperture and then adjusting potentiometer 47 as previously outlined, until the circuit triggers.

(5) The range switch 50 is then resolved to position #4 (or other capacitor position selected, to suit the range of speed desired).

(6) The reset switch 57 is then closed, on switch panel 11. This switch closes reset relay 58. When this reset relay 58 is closed, it short-circuits the capacitor selected, while the short-circuit across the resistance 59 is removed. When the circuit is triggered, the current of the tube 54 will flow through the resistor 59 and the resulting voltage drop can be measured by the vacuum-tube voltmeter 53. The resistor 59 is usually about 100K ohms and the desired current is about 19.2 microamps. The potentiometer 60 in the cathode circuit of the tube 54 is adjusted until the vacuum-tube voltmeter 53 indicates a voltage equal to IR or $100{,}000 \text{ ohms} \times 19.2 \times 10^{-6}$. A charging current index mark is placed on the meter scale for convenience.

(7) The diaphragm of the shutter unit is then restored to full opening. The shutter is then shut and set for lowest speed.

(8) Then switch 57 is closed to actuate the relay 58 and bring the voltmeter 53 to zero.

(9) Then to make the actual evaluating test, the shutter is operated in a conventional manner by hand or otherwise. The speed is read on the scale marked from 0 to 1 1/4 seconds. The operation of the shutter causes the light to strike the photo-cell and induce output of the photo-cell to trigger the measuring circuit and the tube 54 enables whatever capacitor is in the circuit, to charge. When the shutter closes, the tube 54 cuts off, and the charge in the capacitor is thereby measured on the voltmeter 53, indications of which are interpreted in terms of time. When making high speed tests, leakage in the measuring circuit becomes an important and frequently a controlling factor. To prevent error in the tests, it is good practice to cock the shutter, reset circuit with relay switch 57 and then follow by immediately tripping the shutter. This prevents drift in the measuring circuit, between the reset and measuring cycle. A relay switch 61 is used on the instrument, similarly to switch 57. When depressed fully, it triggers the circuit and gives a check on the charging current. This triggering is accomplished by eliminating the bias on tube 49.

*Synchronizing test*

In this test the process that can be followed is as follows:

(1) The output cable of the photo-cell is plugged into the jack 34.

(2) Then the output cable from a flash-gun battery synchronizer is plugged into the jack 33. The negative side of battery is coupled to the sleeve of the cable, or grounded.

(3) The gang switch 40 is revolved to position #3.

(4) The circuit is reset by closing or depressing relay switch 57.

(5) The button on the flash gun is then closed. This applies voltage across the resistance 48, and triggers the tube 49, which in turn cuts off tube 56 and allows the tube 54 to conduct.

(6) The button on the flash gun operates the flash and also the solenoid, for tripping the shutter. When the shutter opens, the output of the photo-cell applies voltage drop across the resistance 62 and fires tube 63. The tube 63 draws current through the resistance 64 and cuts off tube 54. The capacitor charge is then indicated and measured on voltmeter 53.

When the gang switch 40 was turned to position #3 for synchronizing test, the correct timing capacitor was automatically picked up and the meter scale is marked at a point corresponding to correct synchronization of the shutter with flash.

*Quantitative test*

In this test, the process of operation is as follows:

(1) Rotate the gang switch 40 to position #1.

(2) Register the range switch 50 to position #4.

(3) Open the shutter fully and also fully open diaphragm of camera shutter.

(4) Depress the relay switch 57 and adjust the potentiometer 47 until the pointer of the voltmeter aligns with the index mark on scale and shows the correct charging current. In this setup, current through the photocell flows through the resistance 59, and the voltage drop is measured by the voltmeter. During the test, the current flows through the resistance 65, which is a duplicate of the resistor 59. The reason for switching the resistance is to simplify the design.

(5) Then the shutter is closed and set for lowest speed, cocked, circuit reset by depressing switch 57, shutter tripped, and results read on meter.

(6) The range switch 59 may be varied as necessary to correspond with other shutter speeds to be measured.

The construction shown in Figure 2 is a modified form of the invention, differing from Figure 1 in that it is applicable to cameras having focal plane shutters. Such cameras may be tested without disassembly by mounting same on the table 70 forming the top of the cabinet 71. The adjustments of the lamp 72 and photo-cell 73 are made by sliding their respective holders 74 and 75 in a horizontal plane, on a rail 76, suitably designed and attached to the table to permit this. The front panel 77 of the cabinet has the dials and other features similar to those shown in Figure 1. The network is also similar. A hinge cover 78 closes over the table 70, when the equipment is out of use.

The purposes of these tests are practical ones. They are intended to afford an analysis of the inaccuracies that exist in the camera at the time. After obtaining such information, it is a relatively easy matter for the repairman to make the adjustments necessary to bring its accuracy to the highest value.

Figure 4:
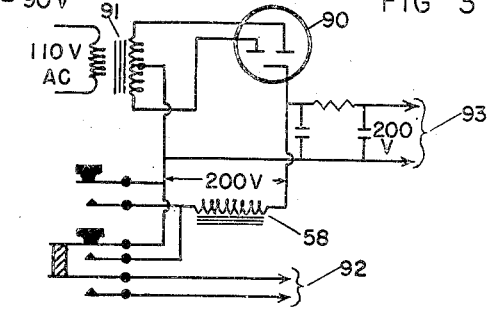
Figure 4 is a detail of the connections used at the relay coil of the network shown in Figure 3.

In Figure 4, a detail of the relay 58 is shown together with its connections. A rectifier tube 90 is energized by a transformer 91, and at 93 supplies current as indicated in the diagram to voltage regulator circuits, for the voltmeter and remaining components of the tester. At 92, the set of points shown trigger the measuring circuit. This part of the network is not used when employing the quantitative test.

In regard to the relay connection. It is immaterial as to where the coil of the relay is connected, as long as power is available to energize the coil when the reset switch points are closed. As evidenced by the diagram, there are two sets of reset points which are normally used, and they are in parallel. One set is on that part of the tester which is used in holding the camera and/or shutter under test. The other set is on the test panel itself and is closed by the same push button which, if pressed hard enough, will trigger the measuring circuit, thus allowing a quick check of the condenser charging current. This last check applies only to those test positions which are used for "interval testing" and "synchronizer testing."

In the present tester, the relay is connected as shown in Figure 4.

In regard to the synchronizer test. All modern photo-flash lamps require time to build up to full brilliance after flashing current has been applied to them. With the exception of certain midget bulbs, the average lamp requires approximately $1/50$ second to poduce maximum light output. It is at this point that the camera shutter should be open. In order that such a condition will exist, many different devices are employed to trip the shutter after flashing voltage has been applied to the flash bulb. For most bulbs, this delay in shutter tripping should be approximately $1/50$ of a second. To measure this delay the flashing voltage must trip the interval-measuring circuit and the regular test light passing through the shutter must stop the measurement. In practice, the flashing voltage is connected to the input of the measuring-circuit amplifier and the output of the photo-cell is connected to a conventional gas tube (not shown). When the flash bulb is flashed, the flashing voltage will be applied to the amplifier and the measuring circuit will function. As soon as the shutter is opened, light will fall on the photo-cell, the output of which will fire the gas tube referred to, and thus stop the measuring circuit. The resultant time measurement will be an indication of how well the shutter is synchronized for any flash bulb it is desired to use.

It is obvious that, if the synchronizer being tested, is adjustable (and most are), the synchronizer can be adjusted to give the proper time-delay for the flash bulb to be used. For convenience, $1/50$ of a second is marked on the scale, since this time is approximately correct for the majority of flash bulbs.

While two forms of the invention are shown in the drawings, it is not desired to limit this application for patent to such forms or in any other manner consistent with the principles of the invention and the scope of the appended claim.

What is claimed is:

A camera shutter testing device comprising a light source arranged to illuminate the shutter, a photcell adapted to receive light when the shutter is open and to translate the light into electrical energy, a first tube connected to receive the output of said photocell, said first tube being rendered conductive by said electrical energy, a second tube connected to receive the output of said first tube, said second tube being rendered non-conductive when said first tube is conducting, a third tube connected to receive the output of said second tube, said third tube being rendered conductive when said second tube is not conducting, a timing capacitor disposed in the output circuit of said third tube, said capacitor charging when said third tube is conducting, and indicator means connected to said capacitor for measuring the time interval that said capacitor is charging, said interval being the time between the opening and closing of said shutter.

GEORGE H. COLEMAN.

REFERENCES CITED

The following references are of record in the file of this patent:

UNITED STATES PATENTS

| Number | Name | Date |
| --- | --- | --- |
| 1,946,290 | Lord | Feb. 6, 1934 |
| 2,261,010 | Weiss | Oct. 28, 1941 |
| 2,274,158 | Penther | Feb. 24, 1942 |
| 2,301,195 | Bradford | Nov. 10, 1942 |
| 2,314,254 | Temple | Mar. 16, 1943 |
| 2,376,162 | Merriman et al. | May 15, 1945 |

Certificate of Correction

Patent No. 2,477,578

August 2, 1949

GEORGE H. COLEMAN

It is hereby certified that errors appear in the printed specification of the above numbered patent requiring correction as follows:

Column 5, line 25, after the word "shutters" insert a period; line 26, strike out "and that, when such a test is used," and insert therefor *With this tester*; column 9, line 62, for "poduce" read *produce*; column 10, line 34, for "photcell" read *photocell*; and that the said Letters Patent should be read with these corrections therein that the same may conform to the record of the case in the Patent Office.

Signed and sealed this 27th day of December, A. D. 1949.

[SEAL]

THOMAS F. MURPHY,
*Assistant Commissioner of Patents.*